United States Patent [19]
Sugahara et al.

[11] 3,915,731
[45] Oct. 28, 1975

[54] AQUEOUS COMPOSITION CONTAINING COLOR FORMER FOR PRESSURE-SENSITIVE PRODUCTION

[75] Inventors: Yujiro Sugahara, Tokyo; Tadahisa Nakazawa, Shibata; Kouichi Usui; Masahide Ogawa, both of Kitakanbara, all of Japan

[73] Assignee: Mizusawa Kagaku Kogyo Kabushiki Kaishi, Osaha, Japan

[22] Filed: Jan. 24, 1973

[21] Appl. No.: 326,465

[30] Foreign Application Priority Data
Jan. 28, 1972   Japan .................. 47-009785

[52] U.S. Cl. ................ 106/287 S; 106/22; 106/23; 106/72; 106/288 B; 117/36.2; 117/36.8
[51] Int. Cl.² ................ B41M 5/16; C09D 11/16
[58] Field of Search ............ 106/287 S, 22, 23, 72, 106/288 B; 117/36.8, 36.2

[56] References Cited
UNITED STATES PATENTS

| | | | |
|---|---|---|---|
| 2,548,366 | 4/1951 | Green et al. | 117/68 |
| 3,622,364 | 11/1971 | Sugahara | 117/36.2 |
| 3,730,754 | 5/1973 | Farber et al. | 117/36.8 |
| 3,753,761 | 8/1973 | Sugahara et al. | 106/288 B |
| 3,769,062 | 10/1973 | Ishige et al. | 117/36.8 |

*Primary Examiner*—Melvin T. Marquis
*Assistant Examiner*—H. H. Fletcher
*Attorney, Agent, or Firm*—Sherman & Shalloway

[57] ABSTRACT

An aqueous composition containing a color former for pressure sensitive recording paper having good primary and secondary color-developing abilities and an excellent smoothening property, said composition comprising a dispersion of fine particles of a clay mineral of the montmorillonite group, a clay mineral of the kaplinite-group halloysite type, or an acid-treated product thereof in an aqueous medium containing a water-miscible organic solvent in an amount not exceeding 30% by weight, said composition having a water-affinity coefficient (Kw), defined in the specification, of 1.3 to 3, and a method for producing the aqueous composition. This aqueous composition, when coated on a receiving sheet or an intermediate sheet of the recording paper, provides smooth and lustrous surface and has a reduced tendency to cause wear or damage to printing types or cutting blades when printing or cutting the sheet.

9 Claims, 1 Drawing Figure

Fig. 1

AQUEOUS COMPOSITION CONTAINING COLOR FORMER FOR PRESSURE-SENSITIVE PRODUCTION

This invention relates to an aqueous composition containing a color former for pressure-sensitive recording paper, and to a method for producing this composition. More specifically, this invention relates to an aqueous composition comprising a dispersion of fine particles of a clay mineral of the montmorillonite group, a clay mineral of the kaolinite group halloysite type, or an acid-treated product thereof in an aqueous medium containing a water-miscible organic solvent in an amount not exceeding 30 % by weight, said composition having a water-affinity coefficient (Kw), as defined hereinbelow, of 1.3 to 3, and to a method for producing said composition.

The conventional pressure sensitive recording papers, with a few exceptions in the case of special papers, are in all cases those which are based on a color development reaction ascribable to the transfer of electrons between a leuco compound of an electron-donating organic dye and a color former which is an electron acceptor (U.S. Pat. 2,548,366).

The leuco compound of an organic dye, the color reactant, may, for example, be a mixture of two dyes which exhibit different coloring behaviors from each other. One of these dyes is that which, as in the case, for example, of derivatives of triphenylmethane, develops color intensively and immediately upon contacting a solid acid, but which has a tendency to fade easily (primary color-developing dye). The second dye is one which does not immediately develop color upon contacting a solid acid but develops its color completely after a lapse of several days and exhibits sufficient fastness to sunlight. An example of such a dye is an acyl-leucomethylene blue (secondary color-developing dye).

On the other hand, solid acids are generally used as the color formers, but finely divided particles of an organic synthetic polymer such as a phenol resin are also used. The known solid acids include kaolin, bentonite, attapulgite, silica gel, acid clay, activated clay, and halloysite.

The pressure sensitive recording paper using these dyes and color formers is made up of two classes of paper: one the transfer sheet (referred to as a coated back or simply CB), a paper sheet which has been coated with microcapsules consisting of a shell of gelatin, gum arabic or a synthetic resin and an oil solution of primary and secondary color-developing dyes and having a size of several microns in diameter, and the other the receiving sheet (referred to as a coated front or simply CF), a paper sheet coated with a color former such as the solid acid or the organic synthetic polymer described. When the two paper sheets are superposed with their coated surfaces facing each other and pressure is applied with a pencil, ballpoint pen or typewriter, the capsules of that portion to which the pressure has been applied rupture, and the oil and the colorless dyes come into contact with the color former to develop color and thus impress that portion with a colored marking. Where two or more copies are required, one or more intermediate paper sheets which are generally referred to as a coated front and back sheet (or CFB), one which has the front coated with the color-former and the back coated with the color-developing dyes, are used interleaved between the transfer sheet and the receiving sheet.

In the conventional process for producing a receiving sheet or intermediate sheet using a solid acid as a color former, acid clay belonging to the montmorillonite clay minerals or its acid-treated product (activated clay) is dry pulverized to particles at least 75 % by weight of which are not more than 10 microns in particle size and not more than about 15 % by weight of which are not more than 1 micron in particle size, and these particles are coated on, and bonded to, paper sheets using a large quantity of a paste such as casein, carboxymethyl cellulose or a synthetic adhesive such as an SBR latex thereby to form the receiving sheet or intermediate sheet.

These conventional receiving sheets or intermediate sheets are thick and have a roughened feel on the surface and a poor surface luster. Furthermore, since color is developed on the solid acid particles coated on the receiving sheet or intermediate sheet, the particles tend to drop off or peel off. Also, these sheets have the defect of being highly abrasive against machinery and cause a wear of machine parts, printing types, etc.

A primary object of this invention is to provide an aqueous composition containing a solid color former for a pressure sensitive recording paper, which has good primary and secondary color-developing abilities and a very good smoothening property, and a method for producing the aqueous composition.

Another object of this invention is to provide an aqueous composition containing a color former for a pressure sensitive recording paper, which when coated on, and bonded to, a receiving sheet or an intermediate sheet, provides smooth and lustrous surface and has a reduced tendency to cause wear or damage to printing types or cutting blades when printing or cutting the sheet, and also a method for producing the aqueous composition.

Still another object of this invention is to provide an aqueous composition containing a color former for a pressure sensitive recording paper, which has a relatively low viscosity and can be easily coated even in a relatively high concentration and a method for producing the aqueous composition.

Further objects and advantages of this invention will become apparent from the following description.

According to the present invention, the above objects and advantages can be achieved by an aqueous composition comprising a dispersion of fine particles of a clay mineral of the montmorillonite group, a clay mineral of the kaolinite group halloysite type, or an acid-treated product thereof in an aqueous medium containing a water-miscible organic solvent in an amount not exceeding 30 % by weight, said composition having a water-affinity coefficient (Kw), defined below, of 1.3 to 3:

$$Kw = \frac{W_1 - W_2}{W_2 - W_1 \times \left(5.85 \times 10^{-2} \times \frac{AX}{B}\right)}$$

wherein $W_1$ is the weight in grams of a precipitated portion of a sample remaining in a centrifugal precipitation tube when a given amount (for example, 5 g) of the sample of said aqueous composition containing said clay mineral or its acid-treated product in a concentration of 10 % by weight whose pH has been adjusted to 2 (± 0.5) with an aqueous solution of hydrochloric acid or sodium hydroxide is taken into said centrifugal precipitation tuve and rotated by a centrifugal separator for 10 minutes with a centrifugal effect of 800 G, and the resulting supernatant liquid is separated;

$W_2$ is the weight in grams of a solid obtained by drying said precipitated portion ($W_1$ grams) at 500°C. to an equilibrium moisture content;

A is the normality of said aqueous solution of hydrochloric acid or sodium hydroxide used to adjust the pH of said aqueous composition to 2 (± 0.5);

X is the amount in milliliters of said aqueous solution of hydrochloric acid or sodium hydroxide;

and B is the weight in grams of said aqueous composition used as a sample (for example, 5 g).

Furthermore, according to the present invention, the above-described aqueous composition can be produced, for example, by drying a clay mineral of the montmorillonite group, a clay mineral of the kaolinite group halloysite type, or an acid-treated product thereof at a temperature not exceeding 650°C., if desired dry pulverizing said clay mineral or an acid-treated product thereof (pulverizing in a gaseous atmosphere), then pulverizing it in a liquid medium comprising water, an organic solvent or a mixture of these, if desired replacing said liquid medium by an aqueous medium containing not more than 30 % by weight (inclusive of zero percent) of a water-miscible organic solvent to form a dispersion of the finely divided particles of said clay mineral or its acid-treated product in said aqueous medium, and adjusting the water-affinity coefficient as defined by the following equation of said aqueous composition to not less than 1.3 but not more than 3:

$$Kw = \frac{W_1 - W_2}{W_2 - W_1 \times \left(5.85 \times 10^{-2} \times \frac{AX}{B}\right)}$$

wherein $W_1$ is the weight in grams of a precipitated portion of a sample remaining in a centrifugal precipitation tube when a given amount (for example, 5 g) of the sample of said aqueous composition containing said clay mineral or its acid treated product in a concentration of 10 % by weight whose pH has been adjusted to 2 (± 0.5) with an aqueous solution of hydrochloric acid or sodium hydroxide is taken into said centrifugal precipitation tube and rotated by a centrifugal separator for 10 minutes with a centrifugation effect of 800 G, and the resulting supernatant liquid is separated;

$W_2$ is the weight in grams of a solid obtained by drying said precipitated portion ($W_1$ grams) at 500°C. to an equilibrium moisture content;

A is the normality of said aqueous solution of hydrochloric acid or sodium hydroxide used to adjust the pH of said aqueous composition to 2 (+ 0.5);

X is the amount in milliliters of said aqueous solution of hydrochloric acid or sodium hydroxide;

and B is the weight in grams of said aqueous composition used as a sample (for example, 5 g).

I. STARTING CLAY MINERAL USABLE IN THE PRESENT INVENTION

The clay minerals of the montmorillonite group are said to be classified into two types, the dioctahedral type and the trioctahedral type. A typical example known is acid clay or subbentonite. Although a clay mineral of the montmorillonite group varies in composition according to its place of occurrence, it consists predominantly of $SiO_2$ and $Al_2O_3$ and contains various other ingredients such as MgO, $Fe_2O_3$, (FeO), CaO, $Na_2O$, $K_2O$ and MnO. An aqueous suspension of this mineral generally has a pH of about 4.5 to 9. Any of such clay minerals of the montmorillonite group can be used as a material in the present invention, but of these minerals, those having a specific surface area of at least 60 $m^2/g$, especially at least 85 $m^2/g$ are preferred. The clay minerals of the montmorillonite group having a specific surface area within this range are generally called acid clay or sub-bentonite. Products obtained by treating these montmorillonite clays such as acid clay or subbentonite with an organic or inorganic acid such as acetic acid, formic acid, oxalic acid, citric acid, sulfuric acid, hydrochloric acid or nitric acid or with an aqueous solution of this inorganic or organic acid are called activated clays, which are preferred because of an increased surface area and an increased adsorbing capacity for dyes as compared with the acid clays. When the aqueous solution is used in this acid treatment, the concentration of the aqueous solution is usually at least 5 %, preferably at least 10 %. If desired, the aqueous solution may be heated to a temperature not more than about 300°C., generally not more than 100°C. The treating time may be shorter with higher heating temperatures, and varies according to the heating temperatures. Generally, it is from several minutes to several ten hours. After this acid treatment, the clay is usually washed with water. In the present specification and claims, this product obtained by treating the montmorillonite clay mineral with the inorganic or organic acid or its aqueous solution, which is usually called activated clay, is referred to as an acid-treated product of the montmorillonite clay mineral. These acid-treated products are preferred starting clays in the present invention, and those having a specific surface area of at least 100 $m^2/g$ exhibit excellent color-developing ability and are especially preferred. Aqueous suspensions (for example, 10 wt.% aqueous suspensions) of such acid-treated products usually have a pH lower than 4.5.

Another type of the clay mineral that can be used in the present invention is halloysite belonging to the kaolinite group. The composition of this halloysite clay minerals and the pH of its aqueous suspension are similar to those of the acid clay or sub-bentonite described above.

Products obtained by acid-treatment of this halloysite in the same way as in the case of acid clay or sub-bentonite can also be used as a starting clay in this invention.

The halloysite usually has a specific surface area of 85 $m^2/g$, but those having a specific surface area of at least 100 $m^2/g$ are especially preferred.

The acid-treated products of the montmorillonite or kaolinite-group halloysite clay minerals are preferred because of an increased specific surface area and an increased color-developing ability for primary and secondary pressure sensitive dyes as compared with those which are not acid treated. Above all, the acid-treated products of the montmorillonite clay minerals are especially preferred.

II. DRYING

The montmorillonite or kaolinite-group halloysite clay minerals or the acid-treated products thereof described above are dried (or calcined) at a temperature such that their layered structure will not be destroyed, especially at a temperature between 200° and 650°C., preferably between 250° and 600°C., especially preferably 300° and 500°C., and if desired, pulverized in the dry state (in a gaseous atmosphere) in a pulverizer such as a roller mill, ball mill or tube mill. The resulting product is then wet pulverized as will be described below.

It is preferred that after the above drying and optionally pulverizing, the content of particles having a particle size not more than 1 micron be adjusted to not less than 10 % by weight.

III. WET PULVERIZATION

The clay mineral or its acid-treated product dried and optionally dry-pulverized is then wet pulverized in a liquid medium comprising (a) water, (b) an organic solvent, or (c) a mixture of the organic solvent and water, so that its water-affinity coefficient (Kw) as defined above is 1.3 to 3, preferably 1.4 to 2.7.

The organic solvent (b) may either be (b-1) a water-miscible polar organic solvent or (b-2) a water-immiscible non-polar organic solvent. The pulverization may be performed by any suitable means such as by using a ball mill, tube mill, kady mill, homogenizer, high speed mill, colloid mill, or attriter or by ultrasonic irradiation. Alternatively, it may be effected by stirring with a stirrer of the conventional type equipped with stirring vanes. If desired, after this pulverization treatment, more finely divided particles are classified (elutriation) to separate the clay mineral or its acid-treated product having the specified water-affinity coefficient.

The extent of the above pulverization or stirring and/or the time required therefor may be such that the aqueous composition in accordance with the present invention comprising a dispersion of the montmorillonite-group clay mineral, kaolinite-group halloysite clay mineral or its acid-treated product in an aqueous medium containing not more than 30 % by weight of the water-miscible organic solvent has a water-affinity coefficient (Kw) of at least 1.3 but less than 3, preferably 1.4 to 2.7. Usually, such a pulverization treatment can be performed in said liquid medium for a time between several minutes to several ten hours.

Suitably, the wet pulverization is carried out not only to the extent and for the time which cause the aqueous composition of this invention to have the above specified water-affinity coefficient (Kw); but also, when dry pulverization is not performed before the wet pulverization, said aqueous composition is wet pulverized so that the clay mineral or its acid-treated product contained therein is divided into particles at least 15 % by weight, advantageously at least 20 % by weight, of which are particles having a particle diameter of not more than 1 micron.

The polar organic solvent (water-miscible organic solvent) used for the wet pulverization may, for example, be an alcohol such as methanol, ethanol, butanol, isopropanol, ethylene glycol, propylene glycol or glycerol or a ketone such as acetone or methyl ethyl ketone. These are used either alone or in combination. Those having a boiling point of not more than 100°C., especially not more than 90°C. are preferred for their ease of evaporation after the aqueous composition of this invention has been coated, for example, on a base sheet for a receiving sheet.

In the wet pulverization procedure, the non-polar organic solvent (water-immiscible solvent) cited in (b-2) above may be used. Examples of such a solvent are a hydrocarbon such as propane, butane, pentane, hexane, cyclohexane, benzene, toluene or xylene, a halogenated hydrocarbon such as carbon tetrachloride, trichloroethylene, perchloroethylene, trichloroethane, chlorobenzene, dichlorobenzene or trichlorobenzene, or an ester such as methyl acetate or ethyl acetate. These non-polar solvents are preferably volatile because of the need for being replaced by the aqueous medium containing not more than 30 % by weight of the water-miscible organic solvent. Those having a boiling point of not more than 100°C., especially not more than 90°C., are especially preferred.

Not only water, but also a mixture of water and the polar organic solvent described above, a mixture of water and the non-polar organic solvent or a mixture of the polar organic solvent and the non-polar organic solvent can be used in practising the wet pulverization.

By wet pulverization in such a liquid medium, the clay mineral or its acid-treated product is uniformly divided into finer particles and its hydrating property increases until the water-affinity coefficient as defined hereinabove reaches a suitable value within the range of 1.3 to 3.

If the montmorillonite-group clay mineral, kaolinite-group halloysite type clay mineral, or an acid-treated product thereof is merely dry pulverized, and even if the resulting pulverized particles are dispersed in the aqueous medium used in this invention which contains not more than 30 % by weight of a water-miscible organic solvent, it is very difficult, or even impossible, to increase the water-affinity coefficient (Kw) to more than 1.3.

According to the wet pulverizing technique in accordance with the present invention, the hydrating property of the clay mineral increases, and as a result, its water-affinity coefficient increases. Furthermore, the clay mineral can be very uniformly pulverized as compared with the dry pulverizing technique.

There is a specific relation between the temperature at which the drying step before wet pulverization is carried out and the viscosity (unit, centipoices, for example) of the aqueous composition obtained after wet treatment. Generally, with higher drying temperatures for the starting clay mineral, the viscosity of the resulting aqueous composition decreases, and the higher the drying temperature, the longer is the time required for wet treatment so as to give a specific water-affinity coefficient. However, by wet pulverizing the clay mineral or its acid-treated product after drying it at a temperature not higher than 650°C. and if desired, further classifying (elutriation) the finely divided particles of the clay mineral, there can be formed an aqueous composition of a relatively low viscosity while increasing its water-affinity coeffient (Kw) to 1.3 – 3, preferably 1.4 –

2.7. This aqueous composition can be easily coated on a base sheet of a receiving or intermediate sheet, and after drying, has good primary and secondary color-developing abilities and gives very good surface smoothness. It is very useful therefore as a color former for pressure sensitive recording paper.

When an aqueous medium (which may consist solely of water) containing not more than 30 % by weight of a water-miscible organic solvent (polar organic solvent) is used for the above-mentioned wet pulverization as the liquid medium, the aqueous composition of this invention is directly obtained by this wet pulverization. If desired, such an aqueous composition may be subjected to such an operation as decantation or evaporation to remove part of the aqueous medium. Or an aqueous medium of a suitable composition may be added to this aqueous composition to control the concentration of the clay mineral or its acid-treated product dispersed in the aqueous composition.

If the liquid medium for the wet pulverization is other than the aqueous medium containing not more than 30 % by weight of a water-miscible organic solvent, for example, when it is a water-miscible organic solvent, a non-polar organic solvent, a mixture of these, a mixture of water and more than 30 % by weight of a water-miscible organic solvent, or a mixture of water and non-polar organic solvent, it is necessary that after the wet pulverization, such a liquid medium be replaced by an aqueous medium containing not more than 30 % by weight (inclusive of zero percent) of the water-miscible organic solvent to constitute the aqueous composition of this invention. This replacement can be performed by any means or procedure known to those skilled in the art.

For example, when the wet pulverization is carried out in a polar organic solvent or an aqueous solution of the polar organic solvent in a concentration of more than 30 % by weight, the concentration of the polar organic solvent in the medium is then adjusted to a value not more than 30 % by weight, and the water-affinity coefficient as defined above is adjusted to 1.3 – 3, preferably 1.4 – 2.7. The adjustment of the concentration of the polar organic solvent is performed, for example, by separating and removing part or almost all of the organic solvent from the wet pulverized composition by an arbitrary means such as decantation, filtration or evaporation, and adding a suitable amount of water or an aqueous medium containing not more than 30 % by weight of the organic solvent, and if desired, stirring the mixture to form a uniform dispersion.

When the wet pulverization is carried out in a non-polar organic solvent, it is replaced by an aqueous medium containing not more than 30 % by weight (inclusive of zero percent) of a polar organic solvent to adjust the water-affinity coefficient as defined above to a range of 1.3 – 3, preferably 1.4 – 2.7. This replacement can be easily carried out by adding water or an aqueous medium containing a polar organic solvent in a suitable concentration to the wet pulverized composition, if desired stirring the mixture, and separating the non-polar organic solvent by decantation, for example. The same procedure can be applied when the wet pulverization is carried out using water and a non-polar organic solvent.

The aqueous composition of this invention may further contain an alkali hydroxide such as sodium or potassium hydroxide, a salt of phosphoric acid such as sodium hexametaphosphate or trisodium phosphate, an ammonium salt such as ammonium carbonate or ammonium sulfate, an alkaline earth metal or earth metal hydroxide such as calcium hydroxide, magnesium hydroxide, or aluminum hydroxide, a color-forming assistant or extender such as an oxide or hydroxide of an amphoteric metal such as zinc, tin or bismuth or a complex of a transition metal such as iron, cobalt or copper, and another additive such as a surface active agent or binder. These additives are added during the wet pulverization or after replacing the liquid medium by the aqueous medium used in this invention. If desired, upon addition, the mixture is stirred to form a uniform blend.

According to this invention, an aqueous composition containing 5 – 40 % by weight, preferably 10 – 30 % by weight, of the clay mineral of the montmorillonite group, clay mineral of the kaolinite-group halloysite-type, or an acid-treated product thereof can be obtained by the procedure described above. The particles of the clay mineral (or its acid-treated product) are very uniformly pulverized in the aqueous composition, and the aqueous composition has an increased hydrating property as shown by the water-affinity coefficient described above. Moreover, the aqueous composition has a relatively low viscosity, and can be coated on a base paper with ease, giving high surface smoothness. Receiving or intermediate sheets obtained by coating this aqueous solution have smooth and lustrous surfaces, and are thin. They have a reduced tendency to cause wear to cutting blades or printing types, and the primary and secondary color-developing abilities prove excellent. The various advantages of the aqueous composition of this invention will be demonstrated more specifically by the following Examples.

The invention will be illustrated further by the following Examples, in which the acid treatment conditions, the method of pulverization, and the testing methods for water-affinity coefficient, particle size, smoothness, color-developing ability and specific surface area were those shown below.

1. Acid Treatment

The test clay, 1 Kg (on dry base), is placed in 1.8 liters of 34 % (weight) sulfuric acid, and treated for 12 hours at 85°C., followed by washing with water.

2. Mortar (disintegration grinding)

A suitable amount of the test clay or its acid-treated produce is placed in a mortar, and lightly disintegrated for 5 minutes by a pestle.

3. Dry Pulverization

The test clay or its acid-treated product is dried, and 100 g of this sample is pulverized in a 1-liter pot mill using 500 ml. of ceramic balls having a diameter of 5 mm (about 800 g). The time required for pulverization is determined. The pulverized particles are sieved by a 32 Tyler's mesh, and used as a test sample.

4. Wet Pulverization

The test clay or its acid-treated product (30 g) is placed in a 1-liter pot mill together with 500 ml. of ceramic balls having a diameter of 5 mm (about 800 g) and 270 g of water (concentration about 10 % by weight), and pulverized in the wet state. The time required for pulverization is determined.

5. Water-Affinity Coefficient

An aqueous composition containing the test clay mineral or its acid-treated product is treated with an aqueous solution of hydrochloric acid or sodium hydroxide to adjust its pH to 2 ($\pm 0.5$) and its concentration to 10 % by weight (500° base). Then, a certain amount (for example, 5 g) of the treated aqueous composition is used as a sample. The sample is placed in a centrifugal precipitation tube, and rotated by a centrifuge for 10 minutes with a centrifugal effect of 800 G. The resulting supernatant liquid is separated from the tube by, for example, decantation. The weight of the precipitated portion remaining in the tube is designated $W_1$. The water-affinity coefficient Kw is calculated from the following equation.

$$Kw = \frac{W_1 - W_2}{W_2 - W_1 \times \left(5.85 \times 10^{-2} \times \frac{AX}{B}\right)}$$

wherein
$W_2$ is the weight in grams of a solid obtained by drying said precipitated portion ($W_1$ grams) at 500°C. to an equilibrium moisture content;
A is the normality of said aqueous solution of hydrochloric acid or sodium hydroxide used to adjust the pH of said aqueous composition to 2 ($\pm 0.5$);
X is the amount in milliliters of said aqueous solution of hydrochloric acid or sodium hydroxide;
and B is the weight in grams of said aqueous composition used as sample (for example, 5 g).

The pH of the aqueous composition can be measured by known methods, for example by using a glass electrode pH meter or a pH testing paper.

In the above definition of the water-affinity coefficient, the rotation of the centrifuge with a centrifugal effect of 800 G means that the precipitation tube is rotated so that acceleration due to the centrifugal force acting on a point one-half of the depth of the aqueous suspension in the centrifugal precipitation tube becomes 800 times as large as the acceleration of gravity. The centrifugal effect (Z) is calculated from the following equation.

$$\text{Centrifugal effect } (Z) = r \times \left(\frac{2\gamma n}{60}\right)^2 \times 1/980$$
$$\doteq \frac{r \times n^2}{9 \times 10^4}$$

wherein
r is the distance in centimeters from the center of the rotating axis of the centrifuge to one-half of the depth of the polar solvent suspension in the precipitation tube; and n is the speed of rotation of the precipitation tube in revolutions per minute.

The specific measuring conditions are as follows:

The test sample (10 g on dry base) is placed in a 300 ml. beaker, and mixed with water and 12N aqueous hydrochloric acid to form a slurry having a solids concentration of 10 % by weight whose pH has been adjusted to 2 ($\pm 0.2$) using a glass electrode pH meter. Five grams of the slurry is precisely weighed with a cap-fitted centrifugal precipitation tube of glass make having an inner diameter of 15 mm and a length of 100 to 120 mm, and shaken at room temperature for 30 minutes by means of a vibrator which reciprocates 100 times a minute. The precipitation tube is then set in a centrifugal separator (the maximum rotation radius 55 mm) and rotated for 10 minutes at 2,500 revolutions per minute. (Acceleration due to the centrifugal force acting on the point one-half of the depth of the liquid suspension in the precipitation tube corresponds to 800 times the acceleration of gravity. The centrifugal force acceleration at the bottom of the precipitation tuve is $1.061 \times 10^6$ cm/sec$^2 \approx 1083$ G.) The resulting supernatant liquid is removed, and then the weight of the precipitated portion remaining in the centrifugal precipitation tube is precisely weighed and dried by a constant temperature dryer at 110°C. until an equilibrium moisture content is reached. It is allowed to cool in a desiccator, and the weight thereof is measured. The ratio of the weight of aqueous medium to the solids content of the precipitated portion is expressed as the water-affinity coefficient (Kw).

6. Method of Measuring the Particle Size of the Clay Minerals

The measurement of the particle size is done using an Andreasen sedimentation pipet. The details are described in Encyclopedia of Chemical Technology (R. E. Kirk and D. Othmer), Vol. 12, page 490 (1954). Specifically, this measurement is made in accordance with JIS Z 8901 using a particle size measuring instrument for testing powders. Since the initial dispersion of particles is of especial importance in the present invention, the particle size is measured by the following method.

An aqueous composition having a solids content of about 5 g is placed in a 1-liter narrow-necked bottle, and stirred with the addition of 500 ml. of a 0.12 % aqueous solution of sodium pyrophosphate ($Na_4P_2O_7 \cdot 10H_2O$). The mixture is shaken for 30 minutes by means of a vibrator which reciprocates 140 times a minute and has an amplitude of 8 cm. After shaking, the mixture is transferred into a cylinder of Andreasen pipet, filled up to 20 cm marked line, and then mixed well. Immediately, the sample is sucked up into a liquid reservoir and placed in a measuring bottle with a size of 5 × 5 cm (about 100 ml.) The liquid reservoir is washed two times with water, and the wash liquid is also placed in the same bottle. The sample is dried at 110°C. until its weight becomes constant. After drying, the sample is allowed to cool to room temperature in a desiccator, and its weight ($W_1$ g) is measured. This is used as a blank.

After collecting the blank, the suspension is again well stirred, and allowed to stand. Care is taken not to vibrate the whole apparatus until all the sample is collected.

The precipitation velocity (terminal velocity) of fine particles in liquid is considered to obey the Stokes' Las. The velocity $\mu$ (cm/sec) of a particle having a diameter of $d$ ($\mu$) and a density $\rho$(g/cm$^3$) sedimentating in a liquid having a density $\rho$(g/cm$^3$) and a viscosity $\eta$ (centipoises) is expressed by the following equation.

$$\mu = \frac{980}{18} \times 10^{-6} \times \frac{d^2 (\rho - \rho')}{\eta} \text{ (cm/sec)}$$

Therefore, the time (t in seconds) required for a particle having a diameter of 1 micron present on the liquid surface to settle to the depth of 19.5 cm (the liquid level is lowered by 0.5 cm for every sampling) is expressed by the following equation.

$$t = \frac{19.5}{\mu} = \frac{351}{98} \times 10^5 \times \frac{\eta}{\rho-\rho'}$$

$$= 3.58 \times 10^3 \times \frac{\eta}{\rho-\rho'} \text{(sec)}$$

For example, when a clay particle having a density, $\rho = 2.4$ g/cm$^3$ sedimentates in water at 20°C: ($\eta = 1$ cp, $\rho' = 1$ g/cm$^3$), $t = 256,000$ seconds (71 hours 6 minutes and 40 seconds). In other words, when 71 hours 6 minutes and 40 seconds have elapsed after shaking, at least those particles having a diameter of 1 micron no longer exist. If at this time, a sample is gently sucked up from this depth into the liquid reservoir so as not to cause disturbance to the suspension layer, the sample does not contain particles having a diameter above 1 micron. In the same way as in the case of the blank, the sucked sample is placed in a measuring bottle (5 × 5 cm, 10 ml.), and the liquid reservoir is washed twice with water. The wash liquid is added to the same measuring bottle, and then the sample is dried at 110°C. until its weight becomes constant. It is cooled in the desiccator and weighed ($W_2$ grams). The content of particles having a particle diameter of 1 micron or less is calculated by the following formula $$\text{Content (\%)} = \frac{W_2 - W'_2}{W_1 - W'_1} \times 100$$

wherein $W'_1$ and $W'_2$ are the weights in grams of the measuring bottles when the weights $W_1$ and $W_2$ are obtained respectively.

7. Smoothening Property

A method similar to the BEKK method for measuring the smoothness of paper surface [see (TAPPI standard T 479, Sm-48 Improved Method; Tappi, Vol. 54, No. 5, p. 789 (1971)].

7-1. Apparatus

A stepped tube portion (A) having an outside diameter of 9 mm for securing a rubber tube (inside diameter 6 mm) is fitted to one end of a stainless steel thick tube (inside diameter 15 mm, length about 80 mm), and a flange portion (B) having a thickness of 8 mm and an outside diameter of 40 mm is fitted to the other end. The annular portion (outside diameter 40 mm, inside diameter 15 mm) on the outer surface is precision finished. The apparatus also includes (C) a stainless disc which has a thickness of 10 mm and a diameter of 50 mm and is finished at the outer surface, (D) a mercury manometer, (E) a three-way cock, (F) pipes leading to a vacuum pump (thick rubber tube, traps), and (G) a weight. In operation, the stainless steel thick tube is erected perpendicularly with (B) at the upper part and (A) at the lower part. A and E are connected to each other by the rubber tube, and the two branches of E are connected to D and F by the rubber tubes. A trap for mercury (about 130 ml.) is attached between E and D.

7-2. Procedure 30 g of the sample aqueous composition having a concentration of 20 % by weight (the concentration adjusted by filtration and concentration or dilution with water) is taken into a 100 ml. beaker, and thoroughly stirred after addition of 1 ml. of 50 % SBR latex. It is then coated on Kent paper having a length of 15 cm and a width of 10 cm using a coating rod (No. 10, product of R. D Specialties Company, U.S.A.), and dried spontaneously. The coated paper is inserted between the finished stainless steel surfaces B and C (with the coated surface facing the surface B). The weight (G) is placed on C (G + C = 1,326 g), and connected to the vacuum pump through the three-way cock. Sucking is continued until the reading of the mercury manometer reaches −90 to −100 mmHg, and immediately the suction side of the three-way cock is closed. The time which starts when the reading of the manometer is −80 mmHg and ends when it reaches −20 mmHg is measured by using a stopwatch, and the time in seconds thus measured is made the smoothening property.

When nothing is interposed between B and C (blank), this time is about 60 minutes.

8. Color-Developing Ability

8-1. Preparation of a receiving sheet as a test sample 30 g of the sample aqueous composition having a concentration of 20 % by weight (the concentration adjusted by filtration and concentration or dilution in water), and thoroughly stirred after addition of 1 ml. of 50 % SBR latex. The mixture is coated on Kent paper having a length of 15 cm and a width of 10 cm using a coating rod (No. 10, product of R. D. Specialties Company, U.S.A.). Five coated paper sheets are thus prepared, and the coating is dried spontaneously.

8-2. Primary color-developing ability

A transfer sheet coated with capsules containing a primary color-developing dye (crystal violet lactone) is superposed on the receiving sheet prepared above, and color is developed by applying pressure. In other words, these are superposed so that the color former coated surface of the receiving sheet faces the capsule-coated surface of the transfer sheet, and a pressure of 500 Kg/cm$^2$ is applied to collapse the capsules completely to form color on the receiving sheet.

8-3. Evaluation of the primary color developing ability

The visual density of the colored surface of the receiving sheet is measured by a densitometer at the end of 1 hour and 168 hours respectively after the development of color. Evaluation is made on the basis of the average value of the five samples and observation by the naked eye.

X: color development is weak and infeasible
Δ: color development is weak but feasible
○: sufficiently feasible color development same as the conventional product
◎: better color development than ○
◉: extremely good color development

8-4. Secondary color-developing ability:

[A] Method of color development

The same as method given in (8-2) except that a transfer sheet coated with capsules containing a secondary color-developing dye (benzoyl leucomethylene blue) is used instead of the transfer sheet coated with capsules containing the primary color-developing dye.

[B] Evaluation of the secondary color developing ability

The method (8-3) is used with respect to the colored surface of the receiving sheet obtained by the above method. The results shown in the tables appearing in the Examples, the color-developing ability after 1 hours and 168 hours is given as an overall evaluation.

9. Specific Surface Area

The specific surface area of each sample is measured in accordance with the so-called BET method based on the adsorption of nitrogen gas. For details, reference may be made to the following literature reference.

S. Brunauer, P. H. Emmett, E. Teller, J. Am. Chem. Soc. Vol. 60, 309 (1938)

A part of the suspension whose concentration and pH have been adjusted to 10 % by weight and 2 ($\pm 0.5$) so as to measure its water-affinity coefficient is dried at 150°C. until its weight becomes constant. The dried sample (0.5 to 0.6 g) is placed in a measuring bottle, dried at 110°C. for one hour and then weighed precisely. The sample is placed in an adsorption sample tube (2 – 5 ml.), and heated to 200°C. The tube is then deaerated until the degree of vacuum within the tube reaches $10^{-4}$ mmHg, and the sample is allowed to cool. Then, the adsorption sample tube is placed in liquid nitrogen at about $-196°C$. The amount of $N_2$ gas adsorbed is measured at 4 to 5 points between $PN_2/Po = 0.05 - 0.30$ ($PN_2$; nitrogen gas pressure, Po; atmospheric pressure at time of measurement). The amount of $N_2$ gas adsorbed from which the dead volume has been subtracted is converted into the amount of adsorption at 0°C. and 1 atmosphere, and substituted for B.E.T. formula to determine $V_m[cm^3/g]$ (this shows the amount of nitrogen gas adsorbed which is required to form a monomolecular layer on the surface of the specimen).

The specific surface area S is calculated on the basis of the following equation.

$$S = 4.35 \times V_M \; [m^2/g]$$

EXAMPLE 1

Acid clay occurring in Nakajo-machi, Kitakambara-gun, Niigata Prefecture Japan (to be referred to as acid clay A), treated using 34 % by weight sulfuric acid according to the conditions described in the section of the present specification entitled "Acid Treatment," acid clay occurring in Shibata, Niigata Prefecture (to be referred to as acid clay B), hydrated halloysite occurring in Niigate, and an acid treated product of acid clay A were dried for 90 minutes at a temperature of 110°, 200°, 300°, 400°, 500°, and 600°C. respectively, and were pulverized in water to form an aqueous composition. The water-affinity coefficient, smoothening property, particle size, color-developing ability and specific surface area of each sample were measured. The results are shown in Tables 1 to 4.

Table 1

| Items / Run No. | Drying temperature before pulverization (°C.) | Method of pulverization | Pulverization time (min) | Water affinity coefficient (Kw) | Content of particles with size of 1μ or less | Smoothening property (sec) | Color developing ability — Primary | Color developing ability — Secondary | Specific surface area (m²/g) |
|---|---|---|---|---|---|---|---|---|---|
| Comp. Ex. 1-1 | 110 | Mortar | — | 1.2 | — | — | Δ | Δ | 115 |
| Comp. Ex. 1-2 | " | Dry | 30 | 1.2 | 10 | 10 | Δ | Δ | 115 |
| Ex. 1-1 | " | Wet | 10 | 2.0 | 10 | 10 | Δ | Δ | 115 |
| Comp. Ex. 1-3 | 200 | Mortar | — | 1.2 | — | — | Δ | Δ | 115 |
| Comp. Ex. 1-4 | " | Dry | 30 | 1.2 | 10 | 5 | Δ | Δ | 115 |
| Ex. 1-2 | " | Wet | 10 | 1.8 | 15 | 20 | Δ | Δ | 115 |
| Comp. Ex. 1-5 | 300 | Mortar | — | 1.2 | — | — | ○ | ○ | 110 |
| Comp. Ex. 1-6 | " | Dry | 30 | 1.2 | 5 | 5 | ○ | ○ | 110 |
| Ex. 1-3 | " | Wet | 30 | 2.0 | 20 | 20 | ○ | ○ | 110 |
| Comp. Ex. 1-7 | 400 | Mortar | — | 1.1 | — | — | ○ | ○ | 100 |
| Comp. Ex. 1-8 | 400 | Dry | 30 | 1.1 | 5 | 5 | ○ | ○ | 100 |
| Ex. 1-4 | " | Wet | 10 | 1.5 | 20 | 20 | ○ | ○ | 100 |
| Ex. 1-5 | " | Wet | 60 | 2.4 | 30 | 30 | ○ | ○ | 100 |
| Comp. Ex. 1-9 | 500 | Mortar | — | 1.0 | — | — | ○ | ○ | 80 |
| Comp. Ex. 1-10 | " | Dry | 30 | 1.0 | 5 | below 5 | ○ | ○ | 80 |
| Ex. 1-6 | " | Wet | 30 | 1.5 | 20 | 20 | ○ | ○ | 80 |
| Ex. 1-7 | " | Wet | 60 | 1.7 | 30 | 30 | ○ | ○ | 80 |
| Comp. Ex. 1-11 | 600 | Mortar | — | below 1 | — | — | ○ | ○ | 70 |
| Comp. Ex. 1-12 | " | Dry | 30 | below 1 | 5 | below 5 | ○ | ○ | 70 |
| Ex. 1-8 | " | Wet | 50 | 1.5 | 20 | above 20 | ○ | ○ | 70 |
| Ex. 1-9 | 600 | Wet | 60 | 1.7 | above 20 | above 20 | ○ | ○ | 70 |
| Ex. 1-10 | " | Wet | 1200 | 2.6 | above 85 | above 20 | ○ | ○ | 70 |

Table 2

Experiments on Acid Clay B

| Run No. | Drying temperature before pulverization (°C.) | Method of pulverization | Pulverization time (min) | Water affinity coefficient (Kw) | Content of particles of 1μ or less (%) | Smoothening property (sec) | Color developing ability Primary | Color developing ability Secondary | Specific surface area (m²/g) |
|---|---|---|---|---|---|---|---|---|---|
| Comp. Ex. 2-1 | 110 | Mortar | — | 1.2 | — | — | △ | △ | 125 |
| Comp. Ex. 2-2 | '' | Dry | 30 | 1.2 | 10 | 10 | △ | △ | 125 |
| Ex. 2-1 | '' | Wet | 10 | 2.0 | 10 | 10 | △ | △ | 125 |
| Comp. Ex. 2-3 | 200 | Mortar | — | 1.1 | — | — | △ | △ | 125 |
| Comp. Ex. 2-4 | '' | Dry | 30 | 1.2 | below 10 | 5 | △ | △ | 125 |
| Ex. 2-2 | '' | Wet | 10 | 1.8 | 10 | 20 | △ | △ | 125 |
| Comp. Ex. 2-5 | 300 | Mortar | — | 1.1 | — | — | ○ | ○ | 125 |
| Comp. Ex. 2-6 | '' | Dry | 30 | 1.1 | below 5 | 5 | ○ | ○ | 125 |
| Ex. 2-3 | 300 | Wet | 30 | 2.0 | 15 | 20 | ○ | ○ | 125 |
| Comp. Ex. 2-7 | 400 | Mortar | — | 1.0 | — | — | ○ | ○ | 120 |
| Comp. Ex. 2-8 | '' | Dry | 30 | 1.0 | below 5 | 5 | ○ | ○ | 120 |
| Ex. 2-4 | '' | Wet | 60 | 2.4 | 20 | 30 | ○ | ○ | 120 |
| Comp. Ex. 2-9 | 500 | Mortar | — | 1 | — | — | ○ | ○ | 90 |
| Comp. Ex. 2-10 | '' | Dry | 30 | 1 | below 5 | below 5 | ○ | ○ | 90 |
| Ex. 2-5 | '' | Wet | 120 | 2.5 | 20 | 30 | ○ | ○ | 90 |
| Comp. Ex. 2-11 | 600 | Mortar | — | below 1 | — | — | ○ | ○ | 60 |
| Comp. Ex. 2-12 | '' | Dry | 30 | below 1 | below 5 | below 5 | ○ | ○ | 60 |
| Ex. 2-6 | 600 | Wet | 30 | 1.5 | 20 | 20 | ○ | ○ | 60 |
| Ex. 2-7 | '' | Wet | 150 | 2.5 | 25 | 40 | ○ | ○ | 60 |

Table 3

Experiments on Holloysite

| Run No. | Drying temperature before pulverization (°C.) | Method of pulverization | Pulverization time (min) | Water affinity coefficient (Kw) | Content of particles of 1μ or less (%) | Smoothening property (sec) | Color developing ability Primary | Color developing ability Secondary | Specific surface area (m²/g) |
|---|---|---|---|---|---|---|---|---|---|
| Comp. Ex. 3-1 | 110 | Mortar | — | 1.2 | — | — | ○ | ○ | 85 |
| Comp. Ex. 3-2 | '' | Dry | 30 | 1.2 | 10 | 10 | ○ | ○ | 85 |
| Ex. 3-1 | '' | Wet | 30 | 1.7 | 10 | 10 | ○ | ○ | 85 |
| Comp. Ex. 3-3 | 200 | Mortar | — | 1.1 | — | — | ○ | ○ | 85 |
| Comp. Ex. 3-4 | '' | Dry | 30 | 1.1 | 10 | below 10 | ○ | ○ | 85 |
| Ex. 3-2 | '' | Wet | 240 | 2.4 | 50 | 40 | ○ | ○ | 85 |
| Comp. Ex. 3-5 | 300 | Mortar | — | 1.0 | — | — | ○ | ○ | 85 |
| Comp. Ex. 3-6 | '' | Dry | 30 | 1.0 | 5 | below 10 | ○ | ○ | 85 |
| Ex. 3-3 | 300 | Wet | 240 | 2.4 | 50 | 40 | ○ | ○ | 85 |
| Comp. Ex. 3-7 | 400 | Mortar | — | 1.0 | — | — | ○ | ○ | 80 |
| Comp. Ex. 3-8 | '' | Dry | 30 | 1.1 | 5 | 5 | ○ | ○ | 80 |
| Ex. 3-4 | '' | Wet | 360 | 2.5 | 50 | below 50 | ○ | ○ | 80 |
| Comp. Ex. 3-9 | 500 | Mortar | — | 1.0 | — | — | ○ | ○ | 80 |
| Comp. Ex. 3-10 | '' | Dry | 30 | 1.1 | 5 | 5 | ○ | ⊙ | 80 |
| Ex. 3-5 | '' | Wet | 480 | 2.5 | 50 | above 50 | ○ | ○ | 80 |
| Comp. Ex. 3-11 | 600 | Mortar | — | 1.0 | — | — | ○ | ○ | 64 |
| Comp. Ex. 3-12 | '' | Dry | 30 | 1.1 | 5 | 5 | ○ | ○ | 64 |
| Ex. 3-6 | 600 | Wet | 240 | 1.6 | 50 | 30 | ○ | ○ | 64 |
| Ex. 3-7 | '' | Wet | 1320 | 2.3 | 80 | 60 | ○ | ○ | 64 |

Table 4

Experiments on Acid-Treated Acid Clay A

| Items<br>Run No. | Drying temperature before pulverization (°C.) | Method of pulverization | Pulverization time (min) | water affinity coefficient (Kw) | content of particles of 1μ or less (%) | Smoothening property (sec) | Color developing ability Primary | Color developing ability Secondary | Specific surface area (m²/g) |
|---|---|---|---|---|---|---|---|---|---|
| Comp. Ex. 4-1 | 110 | Mortar | — | 1.2 | — | — | ◎ | ◎ | 250 |
| Comp. Ex. 4-2 | " | Dry | 30 | 1.2 | 10 | 10 | ◎ | ◎ | 250 |
| Ex. 4-1 | " | Wet | 30 | 2.7 | 15 | below 20 | ◎ | ◎ | 250 |
| Comp. Ex. 4-3 | 200 | Mortar | — | 1.2 | — | — | ◎ | ◎ | 250 |
| Comp. Ex. 4-4 | " | Dry | 30 | 1.2 | 10 | 10 | ◎ | ◎ | 250 |
| Ex. 4-2 | " | Wet | 70 | 2.5 | 45 | above 50 | ◎ | ◎ | 250 |
| Comp. Ex. 4-5 | 300 | Mortar | — | 1.1 | — | — | ◎ | ◎ | 250 |
| Comp. Ex. 4-6 | " | Dry | 30 | 1.2 | 10 | 10 | ◎ | ◎ | 250 |
| Ex. 4-3 | 300 | Wet | 90 | 2.4 | 45 | 50 | ◎ | ◎ | 250 |
| Comp. Ex. 4-7 | 400 | Mortar | — | 1.1 | — | — | ◎ | ◎ | 250 |
| Comp. Ex. 4-8 | " | Dry | 30 | 1.1 | 5 | 5 | ◎ | ◎ | 250 |
| Ex. 4-4 | " | Wet | 45 | 1.8 | 20 | 30 | ◎ | ◎ | 250 |
| Ex. 4-5 | " | Wet | 180 | 2.4 | 45 | 55 | ◎ | ◎ | 250 |
| Comp. Ex. 4-9 | 500 | Mortar | — | 1.1 | — | — | ◎ | ◎ | 200 |
| Comp. Ex. 4-10 | " | Dry | 30 | 1.1 | 5 | 5 | ◎ | ◎ | 200 |
| Ex. 4-6 | " | Wet | 240 | 2.4 | 45 | 55 | ◎ | ◎ | 200 |
| Comp. Ex. 4-11 | 600 | Mortar | — | 1.0 | — | — | ◎ | ◎ | 200 |
| Comp. Ex. 4-12 | 600 | Dry | 30 | 1.1 | 5 | 5 | ◎ | ◎ | 200 |
| Ex. 4-7 | " | Wet | 90 | 1.7 | 20 | 25 | ◎ | ◎ | 200 |
| Ex. 4-8 | " | Wet | 360 | 2.4 | 45 | 60 | ◎ | ◎ | 200 |
| Ex. 4-9 | " | Wet | 600 | 3 | 50 | above 60 | ◎ | ◎ | 200 |

EXAMPLE 2

An acid-treated product of acid clay A was dried, and pulverized in a polar organic solvent or its aqueous solution. The liquid was removed by filtration, and water was added to form an aqueous composition having a concentration of about 20 % by weight. The water-affinity coefficient, smoothening property, particle size, color-developing ability and specific surface area of each sample were measured. The results are shown in Table 5.

Table 5

Experiments on Acid-Treated Acid Clay A

| Items<br>Run No. | Drying temperature before pulverization (°C.) | Liquid medium | Ratio of Polar solvent to water in the liquid medium | Pulverization time (min) | Water-affinity coefficient (Kw) | Content of particles with size of 1μ or less (%) | Smoothening property (Sec) | Color-developing ability Primary | Color-developing ability Secondary | Specific surface area [m²/g] |
|---|---|---|---|---|---|---|---|---|---|---|
| Ex. 5-1 | 300 | Ethanol | 100 : 0 | 120 | 2.6 | 45 | above 60 | ◎ | ◎ | 225 |
| Ex. 5-2 | 500 | " | " | 120 | 2.4 | 40 | 50 | ◎ | ◎ | 180 |
| Ex. 5-3 | 300 | Ethanol + water | 75 : 25 | 120 | 2.6 | 45 | above 60 | ◎ | ◎ | 225 |
| Ex. 5-4 | 500 | " | " | 120 | 2.4 | 40 | 50 | ◎ | ◎ | 180 |
| Ex. 5-5 | 300 | Ethanol + water | 50 : 50 | 120 | 2.6 | 45 | 60 | ◎ | ◎ | 225 |
| Ex. 5-6 | 500 | " | " | 120 | 2.4 | 40 | 50 | ◎ | ◎ | 180 |
| Ex. 5-7 | 300 | " | 25 : 75 | 120 | 2.6 | 45 | 60 | ◎ | ◎ | 225 |
| Ex. 5-8 | 500 | " | " | 120 | 2.4 | 40 | 50 | ◎ | ◎ | 180 |
| Comp. Ex. 5-1 | 300 | Dry pulverized product | — | 120 | 1.2 | 15 | 20 | ◎ | ◎ | 250 |
| Comp. Ex. 5-2 | 500 | " | — | 120 | 1.0 | 10 | 10 | ◎ | ◎ | 200 |

EXAMPLE 3

An acid-treated product of acid clay A was dried at 300°C., and pulverized in a non-polar organic solvent or a mixture of a non-polar organic solvent and a polar organic solvent. The solvent was removed, and water was added to form an aqueous composition having a concentration of about 15 % by weight. The water-affinity coefficient, content of particles having a particle size of 1 micron or less, smoothening property, color-developing ability and specific surface area were measured. The results are shown in Table 6.

EXAMPLE 4

20 ml. of a 10 % aqueous solution of sodium hydroxide was added to 100 g (on dry basis) of an acid-treated product of acid clay A, and they were thoroughly mixed. The mixture was dried at 110°C., and pulverized in a polar organic solvent or its aqueous solution. The liquid was removed by filtration, and water was added to form an aqueous composition having a concentration of about 25 %. The water-affinity coefficient, particle size, smoothening property, color-developing ability and specific surface area were measured. The results are shown in Table 7.

Table 6

| Items Run No. | Solvent | Solvent mixing ratio | Pulverization time (min) | Water-affinity coefficient (Kw) | Content of particles with size of 1 μ or less (%) | Smoothening property (Sec) | Color-developing ability Primary | Color-developing ability Secondary | Specific surface area [m²/g] |
|---|---|---|---|---|---|---|---|---|---|
| Ex. 6-1 | benzene | — | 120 | 2.2 | 26 | 30 | ◎ | ◎ | 220 |
| Ex. 6-2 | '' | — | 600 | 2.6 | 40 | 60 | ◎ | ◎ | 220 |
| Ex. 6-3 | Carbon tetrachloride | — | 120 | 2.0 | 25 | 30 | ◉ | ◉ | 220 |
| Ex. 6-4 | n-Hexane | — | 120 | 2.1 | 30 | 40 | ◉ | ◉ | 220 |
| Ex. 6-5 | benzene-ethanol | benzene/ethanol (=60/40) | 120 | 2.4 | 30 | 40 | ◉ | ◉ | 200 |
| Ex. 6-6 | '' | benzene/ethanol (=30/70) | 120 | 2.3 | 30 | 40 | ◉ | ◉ | 200 |
| Ex. 6-7 | benzene-water | benzene/water (=20/80) | 120 | 2.5 | 30 | 30 | ◎ | ◎ | 250 |
| Comp. Ex. 5-1 | Dry pulverized product | | 120 | 1.2 | 15 | 20 | ◎ | ◎ | 250 |

Table 7

| Items Run No. | Polar solvent | Ratio of solvent to water | pulverization time (min) | Water-affinity coefficient (Kw) | Content of particles with size of 1 μ or less (%) | Smoothening property (Sec) | Color-developing ability Primary | Color-developing ability Secondary | Specific surface area [m²/g] |
|---|---|---|---|---|---|---|---|---|---|
| Ex. 7-1 | ethanol | 100:0 | 120 | 2.5 | 45 | above 60 | ◎ | ◎ | 235 |
| Ex. 7-2 | ethanol-water | 75:25 | 120 | 2.5 | 40 | 60 | ◎ | ◎ | 225 |
| Ex. 7-3 | '' | 50:50 | 120 | 2.5 | 35 | 50 | ◎ | ◎ | 200 |
| Comp. Ex. 5-1 | Dry pulverized product | — | 120 | 1.2 | 15 | 20 | ◎ | ◎ | 250 |

EXAMPLE 5

An acid-treated product of acid clay A was dried at 300°C., and pulverized in ethanol, an aqueous solution of ethanol or water. If desired, the liquid was removed by filtration. Ethanol, water or a mixture of these was added to form an aqueous composition which was a dispersion of the acid-treated product of acid clay A in a concentration of 20 % by weight in an aqueous medium containing 30 % by weight of ethanol. The water-affinity coefficient, smoothening property, particle size, color-developing ability and specific surface area were measured. The results are shown in Table 8.

Table 8

| Items<br>Run No. | Drying temperature before pulverization (°C.) | Liquid medium | Ratio of Polar solvent to water in the liquid medium | Pulverization time (min) | Water-affinity coefficient (Kw) | Content of particles with size of 1 μ or less (%) | Smoothening property (Sec) | Color-developing ability | | Specific surface area [m²/g] |
|---|---|---|---|---|---|---|---|---|---|---|
| | | | | | | | | Primary | Secondary | |
| Ex. 8-1 | 300 | Ethanol | — | 120 | 2.4 | 45 | above 60 | ◎ | ◎ | 225 |
| Ex. 8-2 | " | Ethanol-water | 70:50 | 120 | 2.4 | 45 | above 60 | ◎ | ◎ | 225 |
| Ex. 8-3 | " | " | 50:50 | 120 | 2.3 | 45 | above 60 | ◎ | ◎ | 225 |
| Ex. 8-4 | " | " | 30:70 | 120 | 2.4 | 45 | above 60 | ◎ | ◎ | 225 |
| Ex. 8-5 | " | Water | — | 120 | 2.5 | 50 | above 60 | ◎ | ◎ | 250 |
| Comp. Ex. 5-1 | " | Dry pulverized product | — | 120 | 1.2 | 15 | 10 | ◎ | ◎ | 250 |

EXAMPLE 6

Figure 1:
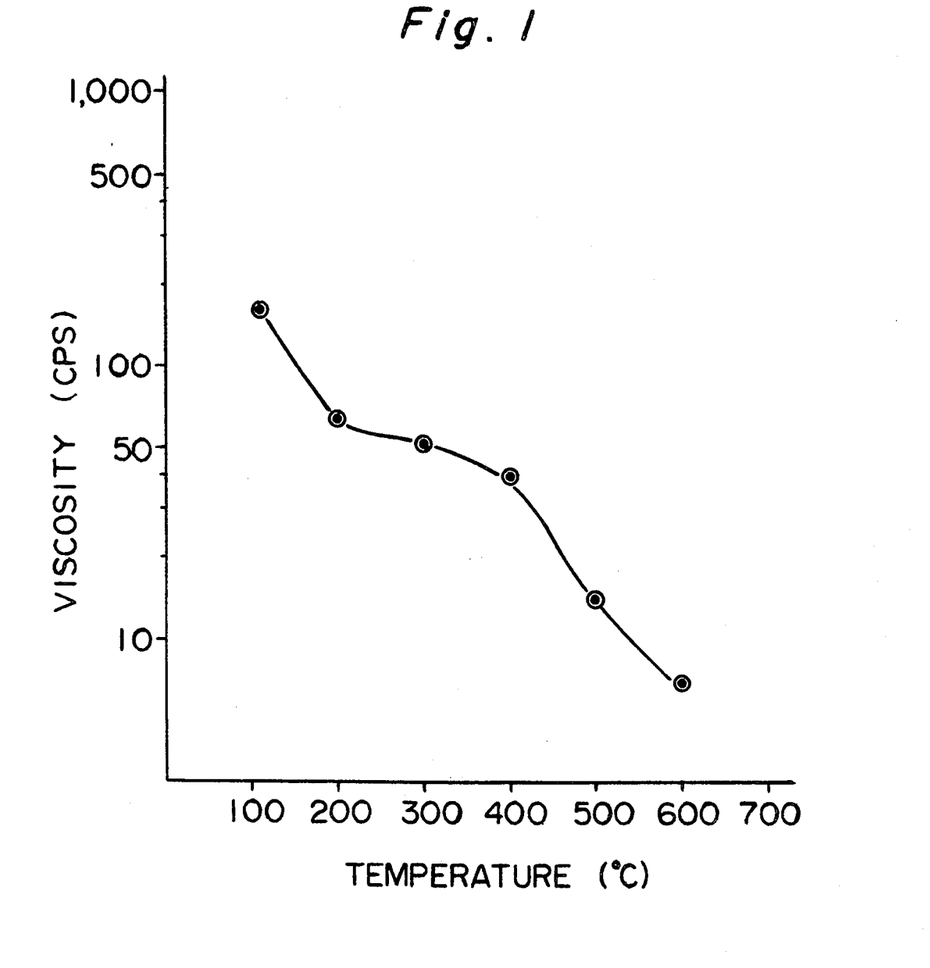
FIG. 1 shows the relationship between the drying temperature of the clay and the viscosity of slurries made from it.

The viscosities of the sample slurries in Example 4-1 (drying temperature 110°C.), Example 4-2 (drying temperature 200°C.), Example 4-3 (drying temperature 300°C.), Example 4-5 (drying temperature 400°C.), Examples 4-6 (drying temperature 500°C.), and Example 4-8 (drying temperature 600°C.) were measured by a Brookfield type viscosimeter (B-type viscosimeter). The results are shown in FIG. 1 in which the axis of ordinates represents the viscosity in centipoises and the axis of abscissas the drying temperature in degrees centigrade before pulverization.

Table 4 – 8 all relate to the aqueous composition of the present invention obtained by considerable vigorous pulverization of an acid-treated clay mineral of the montmorillonite group in a liquid medium for a considerably long period in accordance with the method of this invention. These tables illustrate that the aqueous composition of the present invention exceeds by far those in Tables 1 – in both the color-developing ability and the smoothening property.

What is claimed is:

1. An aqueous composition containing a color developer for pressure-sensitive recording paper having excellent smoothness, said composition comprising a dispersion of 5 – 40% by weight fine particles of an acid-treated clay mineral of the montmorillonite group in an aqueous medium containing 0 – 30% by weight of a water-miscible organic solvent, at least 20% by weight of said particles having a particle diameter of not more than 1 micron and said composition having a water-affinity coefficient (Kw), defined below, of 1.3 to 3:

$$[ Kw = \frac{W_1 - W_2}{W_2 - W_1 \times [ 5.85 \times 10^{-2} \times \frac{AX}{B5}]} ]$$

$$Kw = \frac{W_1 - W_2}{W_2 - W_1 \times \left(5.85 \times 10^{-2} \times \frac{AX}{5}\right)}$$

wherein $W_1$ is the weight in grams of a precipitated portion of a sample remaining in a centrifugal precipitation tube when 5 g of the sample of said aqueous composition containing said acid-treated clay mineral in a concentration of 10% by weight whose pH has been adjusted to 2 ($\pm$ 0.5) with an aqueous solution of hydrochloric acid or sodium hydroxide is taken into said centrifugal precipitation tube and rotated by a centrifugal separator for 10 minutes with a centrifugation effect of 800 G, and the resulting supernatant liquid is separated; $W_2$ is the weight in grams of a solid obtained by drying said precipitated portion at 500°C. to an equilibrium moisture content; A is the normality of said aqueous solution of hydrochloric acid or sodium hydroxide used to adjust the pH of said aqueous composition to 2 ($\pm$ 0.5); X is the amount in milliliters of said aqueous solution of hydrochloric acid or sodium hydroxide.

2. The aqueous composition of claim 1 which has a water-affinity coefficient of 1.5 to 2.7, with the proviso that it has a pH of 2 and the concentration of said clay mineral is 10 % by weight.

3. The aqueous composition of claim 1 wherein the concentration of the water-miscible organic solvent in the aqueous medium does not exceed 15 % by weight.

4. A method for producing an aqueous composition containing a color developer for pressure-sensitive recording paper having excellent smoothness, which comprises drying an acid-treated clay mineral of the montmorillonite group at a temperature not exceeding 650°C., then pulverizing or stirring it in a liquid medium comprising water, an organic solvent or a mixture of these, adjusting said liquid medium to an aqueous medium containing 0 – 30 % by weight of a water-miscible organic solvent when said aqueous medium is not used as said liquid medium to form a dispersion of finely divided particles of said clay mineral, at least 20% of said particles having a particle diameter of not more than one micron, and adjusting the water-affinity coefficient as defined by the following equation of said aqueous composition to not less than 1.3 but not more than 3:

$$Kw = \frac{W_1 - W_2}{W_2 - W_1 \times \left(5.85 \times 10^{-2} \times \frac{AX}{5}\right)}$$

wherein $W_1$ is the weight in grams of a precipitated portion of a sample remaining in a centrifugal precipitation tube when a given amount 5 g of the sample of said aqueous composition containing said clay mineral or its acid treated product in a concentration of 10% by weight whose pH has been adjusted to 2 (± 0.5) with an aqueous solution of hydrochloric acid or sodium hydroxide is taken into said centrifugal precipitation tube and rotated by a centrifugal separator for 10 minutes with a centrifugation effect of 800 G, and the resulting supernatant liquid is separated;

$W_2$ is the weight in grams of a solid obtained by drying said precipitated portion at 500°C. to an equilibrium moisture content; A is the normality of said aqueous solution of hydrochloric acid or sodium hydroxide used to adjust the pH of said aqueous composition to 2 (± 0.5), and X is the amount in milliliters of said aqueous solution of hydrochloric acid or sodium hydroxide and B is the weight in grams of said aqueous composition used as a sample whereby said composition used as a sample whereby said composition contains a dispersion of 5 – 40% by weight of said clay mineral.

5. The method of claim 4 wherein clay mineral is dried at a temperature not exceeding 650°C., dry pulverized, and then pulverized in an aqueous medium containing 0 – 30% by weight of a water-miscible organic solvent, thereby to adjust the water-affinity coefficient to 1.3 – 3.

6. The method of claim 4 wherein said clay mineral is dried at a temperature not exceeding 650°C., dry pulverized, and pulverized in a polar organic solvent or an aqueous solution of said polar organic solvent containing the solvent in an amount in excess of 30 % by weight, and then the concentration of the polar organic solvent in the medium is adjusted to not more than 30 % by weight, thereby to adjust the water-affinity coefficient to 1.3 – 3.

7. The method of claim 4 wherein said clay mineral is dried at a temperature not exceeding 650°C., dry pulverized, and pulverized in a non-polar organic solvent, and then the non-polar organic solvent is replaced by an aqueous medium containing 0 – 30 % by weight of a polar organic solvent, thereby to adjust the water-affinity coefficient to 1.3 – 3.

8. The method of claim 4 wherein said pulverization is carried out so that the water-affinity coefficient of said aqueous composition reaches a range of 1.4 – 2.7.

9. The method of claim 4 including the step of dry pulverizing said clay mineral prior to pulverizing or stirring in said liquid medium.

* * * * *

UNITED STATES PATENT OFFICE
CERTIFICATE OF CORRECTION

Patent No. 3,915,731       Dated October 28, 1975

Inventor(s) Yujiro Sugahara et al.

It is certified that error appears in the above-identified patent and that said Letters Patent are hereby corrected as shown below:

Page 1, left-hand column, item 73, delete "Osaha", insert
-- Osaka --

Page 1, left-hand column, item 30, please change to read as follows:

-- Jan. 28, 1972     Japan....................47/9785
   Feb. 16, 1972     Japan....................47/15609
   Mar. 6, 1972      Japan....................47/22288  --

Claim 1, column 22, line 50, delete the equation in brackets, (first equation), in its entirety.

Signed and Sealed this third Day of February 1976

[SEAL]

Attest:

RUTH C. MASON
Attesting Officer

C. MARSHALL DANN
Commissioner of Patents and Trademarks